Sept. 29, 1931. F. M. YOUNG 1,825,036
VEHICLE HEATER
Filed June 17, 1929 3 Sheets-Sheet 2

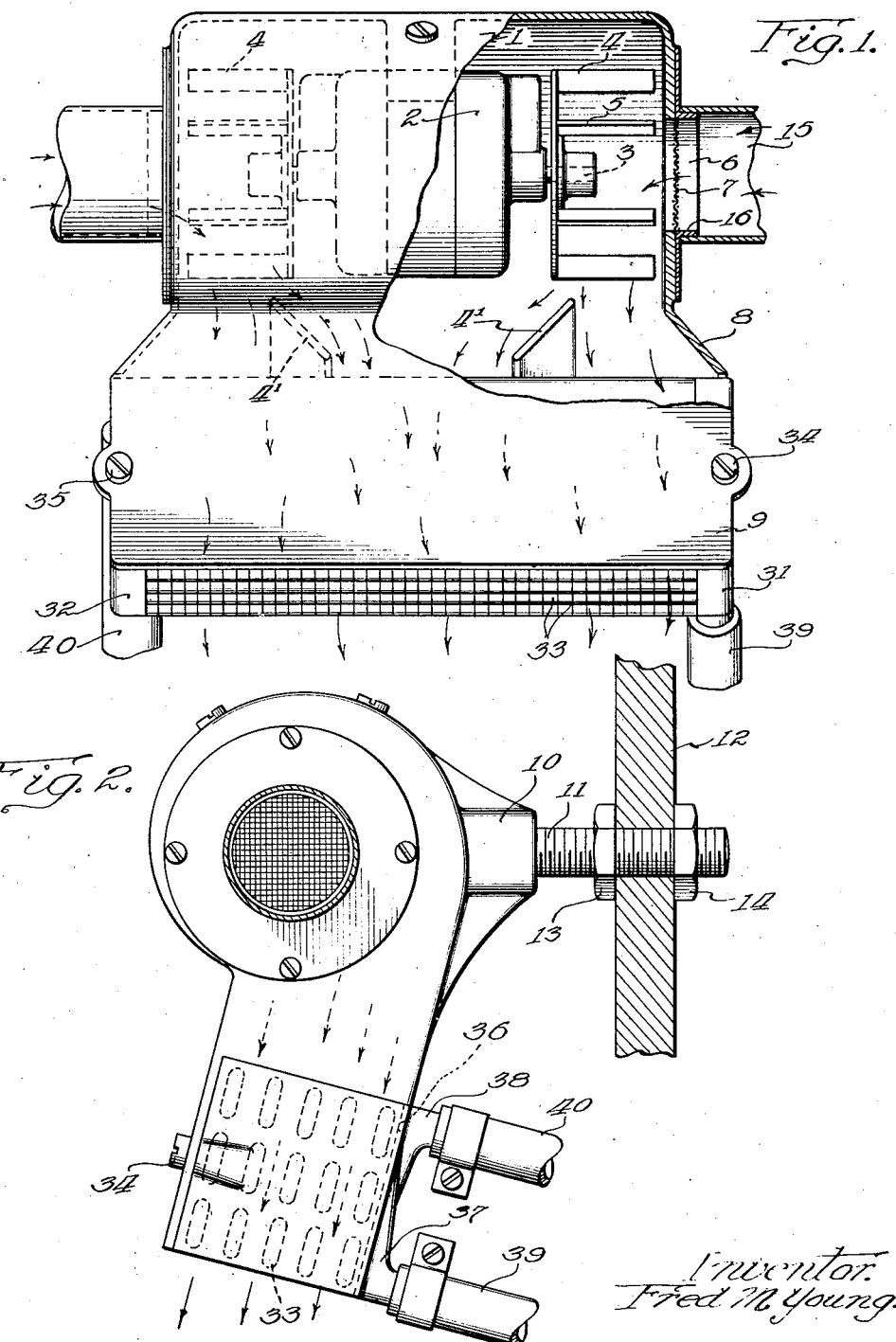

Witness
Arthur M. Franke.

Inventor:
Fred M. Young.
By Rummler & Rummler
Attys:

Sept. 29, 1931.  F. M. YOUNG  1,825,036
VEHICLE HEATER
Filed June 17, 1929  3 Sheets-Sheet 3
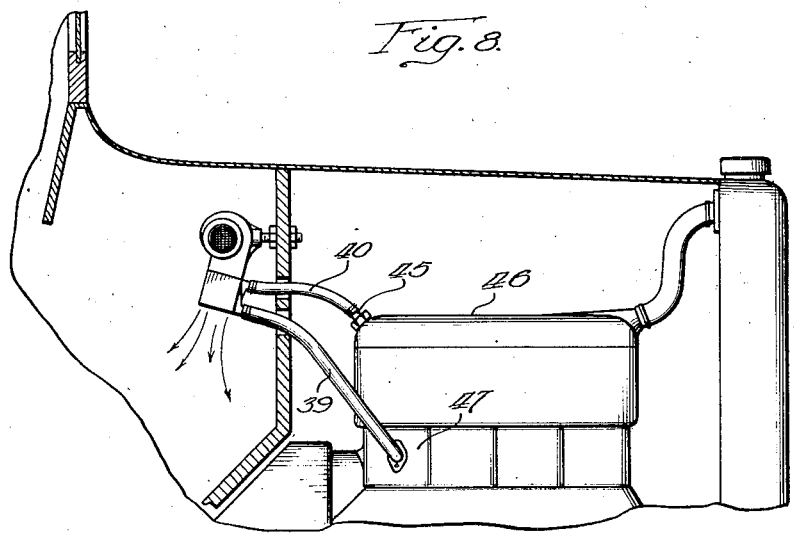
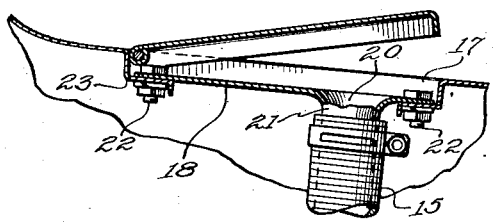
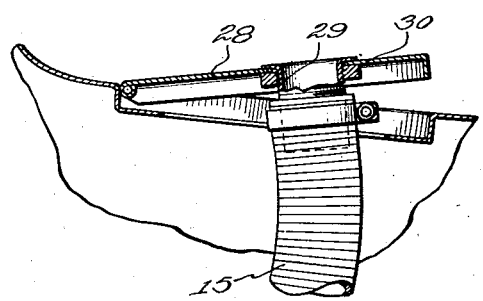

Patented Sept. 29, 1931

1,825,036

UNITED STATES PATENT OFFICE

FRED M. YOUNG, OF RACINE, WISCONSIN

VEHICLE HEATER

Application filed June 17, 1929. Serial No. 371,390.

This invention relates to an improved heater for vehicle bodies.

The main objects of this invention are to provide means for supplying fresh heated air to the interior of a vehicle body, to provide improved means for drawing air from the exterior of a vehicle into an air heater in the interior thereof and heating the air before it is discharged into the passenger compartment; to provide a heater of improved construction from which the heating unit may be conveniently removed and cleaned; to provide an improved heater in which a heat interchanger of the water tube type may be employed; to provide improved means which may be readily adapted for ventilators of different shapes and dimensions for connecting the heater with the atmosphere exterior of a vehicle body.

Further objects of this invention are to provide an improved means for connecting a heater with the atmosphere exterior of the car body by a flexible tube connection with the closure of the cowl ventilator of a vehicle so as to allow fresh air to be alternatively supplied to the interior of the body through the heater alone, or through the heater and the ventilator together, and to provide a space heater of improved shape for facilitating a downwardly directed discharge of heater air in the body of a vehicle thereby avoiding the direct discharge of heated air upon passengers.

In the accompanying drawings I have shown a specific embodiment of my invention, in which:

Figure 1 is a front view of a heater showing the casing broken away and disclosing underlying parts.

Fig. 2 is an end elevation.

Fig. 8 is a diagrammatic section illustrating another connection of the improved heater with the engine cooling system of an automobile.

Fig. 9 is a fragmentary section of an automobile cowl ventilator showing an attachment for connecting the heater thereto.

Fig. 10 is a fragmentary section of a cowl ventilator showing another attachment for connecting the heater thereto.

Figure 3:
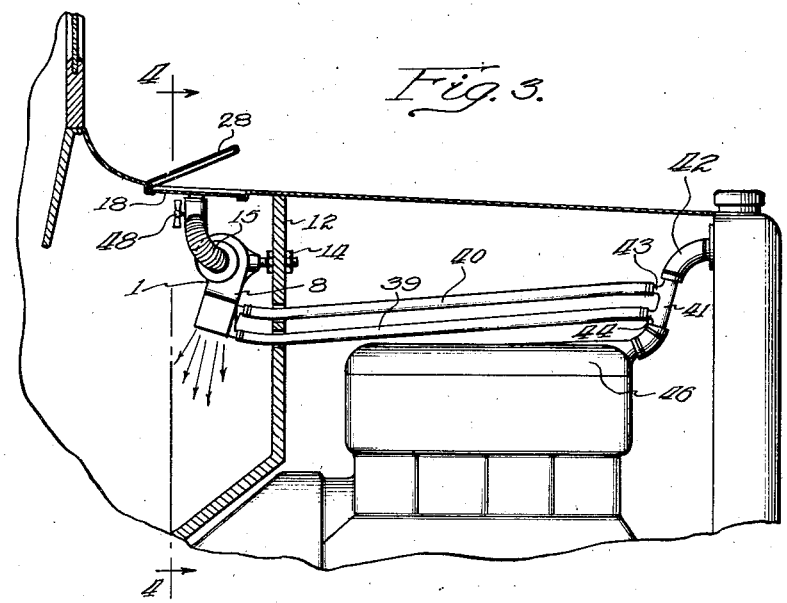
Fig. 3 is a diagrammatic section of an automobile embodying my improved heater, illustrating one connection thereof to the engine cooling system.

In the form shown, the improved heater comprises a blower casing containing a motor on which two blower rotors are mounted, a bottom discharge spout and side inlet openings. A threaded stud on the casing is provided for conveniently mounting the device in the passenger compartment of a vehicle and a flexible tube communicating with the inlet openings and with the atmosphere exterior of the vehicle, supplies fresh air to the blowers.

A heat interchanger, comprising spaced heater tanks connected together by a plurality of heat transferring tubes arranged to allow the passage of air therebetween, is positioned across the open end of the discharge spout of the blower and removably attached to a lip on the discharge spout by two screws each threaded into one of the header tanks. Pipes, communicating with the header tanks and with the engine cooling system of a vehicle, supply a circulation of heat laden liquid cooling medium through the heat interchanger and the blowers impel air taken from the exterior of the vehicle through the heat interchanger, thereby heating the air before it is discharged into the interior of the vehicle.

In the construction illustrated, the blower comprises an involute casing 1 containing an electrical motor 2 provided with a shaft 3 which extends beyond the opposite sides of the motor housing. Rotary blower members 4, comprising discs having radial vanes 5 for impelling air outwardly from the interior of the casing are secured on the ends of the shaft 3. Air inlet openings 6 formed in the opposite ends of the casing are covered by a screen 7 for preventing solid particles from entering the blower. A discharge spout 8 formed integral with the blower casing 1 extends the full length thereof. The spout 8 has an open end and is provided with a protruding lip 9 which is integral with its top wall. Mounted in the casing adjacent each blower rotor is an inclined air deflector 4' for diverting some of the air impelled by the rotors through the intermediate portions of the discharge spout 8. A boss 10 on the rear side of the casing 1 having a threaded stud 11 therein provides a support by which the heater is conveniently mounted on the partition 12 between the engine and passenger compartments of an automobile, with the aid of nuts 13 and 14.

Figures 4, 5:
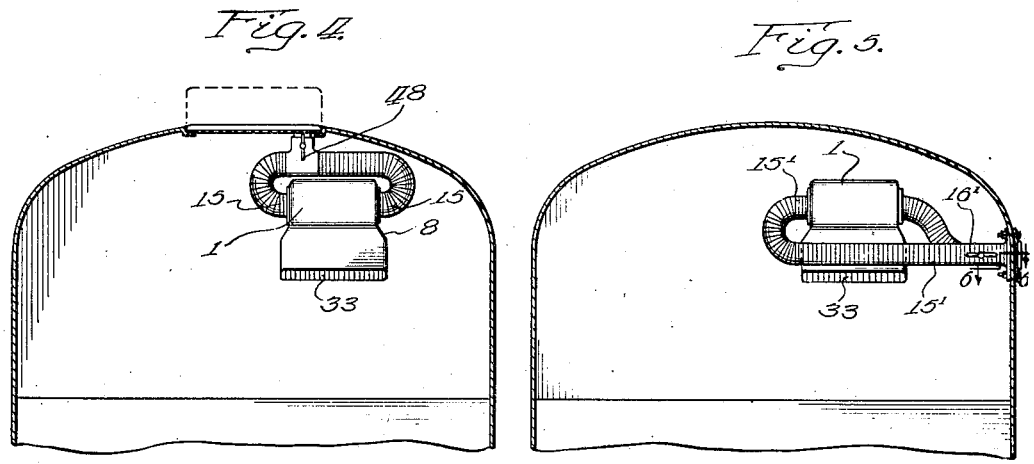
Fig. 4 is a section taken on the line 4—4 of Fig. 3.
Fig. 5 is a similar section showing another arrangment of the heater in a vehicle.
Figure 6:
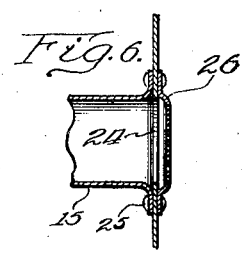
Fig. 6 is a fragmentary section taken on the line 6—6 of Fig. 5.
Figure 7:
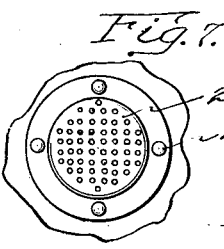
Fig. 7 is a face view of a foraminous vent covering.

In the preferred form of my invention illustrated in Figs. 3 and 4, the ends of a flexible tube 15 are each attached to an annular flange 16 around the inlet openings 6 of the casing 1. The flexible tube 15 communicates with the atmosphere external of the vehicle through a vent opening 17 in the cowl thereof. The tube 15 is firmly held in communication with the vent opening 17 by a plate or stamping 18, having an aperture 20 and a tubular sleeve 21 fitted in the tube 15. The plate is removably mounted in the cowl vent 17 by bolts 22 which extend through registering apertures in the plate 18 and in the edge portions 23 of the cowl around the opening 17 therein. Plates 18 are preferably formed in large sizes so that they may be cut to fit cowl ventes of various shapes and dimensions and conveniently installed without requiring alterations of the cowl.

In the form of my invention shown in Fig. 5 the flexible tube 15' comprising branches communicating with the air inlets of the blower casing, is attached at its end to the side of the automobile body in registration with an aperture 24 therein by rivets 25 or other suitable fastening means. The tube 15' is provided with a butterfly valve 16' for regulating the quantity of air supplied to the passenger compartment. The aperture 24 is covered by a grilled plate 26 secured to the outer side of the body by the rivets 25.

In the form of my invention shown in Fig. 10, the tube 15 is attached to the cowl vent cover 28 by a flanged sleeve 29 extending through an aperture in the cover 28. The sleeve 29 is rigidly clamped on the cover 28 by a nut 30 adjacent the lower side of the cover.

A heating unit, comprising spaced header tanks 31 and 32 and communicating heat transferring tubes 33, is removably attached to the lip 9 of the blower casing by screws 34 and 35 threaded in the tanks 31 and 32 respectively. The tubes of the heat interchanger are arranged in spaced relation relative to each other and they extend longitudinally across the open end of the discharge spout 8. The rear side of the heat interchanger is closed by a bottom plate 36 which, together with the lip 9 forms a restricted air passage at the end of the discharge spout. Nipples 37 and 38 formed on the header tanks 31 and 32 respectively are connected with the engine cooling system of the vehicle by tubes 39 and 40 respectively. The header tanks 31 and 32 are connected with the cooling system in the manner shown in Fig. 3, by providing a double branch coupling 41 in the top radiator hose 42 and fastening the front ends of the tubes 39 and 40 to the branches 43 and 44 respectively of the coupling.

The heat interchanger may also be connected with the engine cooling system of a vehicle in the manner shown in Fig. 8 by connecting the tube 40 with a nipple 45 threaded in an aperture in the rear end of the cylinder head 46, and attaching the tube 39 to the water jacket 47 of the engine in communication with an aperture therein.

When the heat interchanger is connected with the engine cooling system in either of the above ways, heat laden cooling medium circulates through the header tanks and heat transferring tubes. When the blower is in operation the blower rotors 4 draw air from the exterior of the vehicle either through the cowl vent or through apertures in the sides of the cowl and discharge the air drawn in, through the discharge spout 5 of the heater, into the interior of the vehicle. As the air passes through the heat interchanger its temperature is raised sufficiently to warm the interior passenger compartment of the vehicle.

When the fresh air is taken in through the aperture in the cowl vent cover 28 as illustrated in Fig. 10 it is possible to supply a current of fresh heated air and a current of fresh cool air to the interior of the vehicle body simultaneously. This is accomplished by opening the cowl cover slightly while the heater is in operation. If only heated air is desired the cover 28 may be closed and if only cool air is desired, the supply of air through the pipe 15 and heater may be cut off by the valve 48 shown in Fig. 4.

By conveying air to the heater blower from the outside of an automobile, recirculation of stale air in the passenger compartment and the admission of gases from the engine compartment is avoided thereby maintaining the passenger compartment in a warm and healthful condition.

With the aid of the stamping 18 the heater may be readily connected with the cowl vent of vehicles of any make and if it is desired to remove the heater from the vehicle during summer time, and allow cool air to enter the vehicle through the cowl vent 17, the device may be conveniently detached by removing the bolts 22.

Although but one specific embodiment of this invention has been herein shown and described, it will be understood that details of the construction shown may be altered or omitted without departing from the spirit of this invention as defined by the following claims.

I claim:

1. In a vehicle having a cowl vent, means for drawing air through said vent and heating the air and discharging it into the interior of the vehicle, comprising a blower and a housing therefor, a heat interchanger located within said housing, a closure for the cowl vent having an aperture therein, a tube communicating with the aperture in said vent closure, and connected with the housing of the blower for conveying fresh air thereto.

2. In a vehicle having a cowl vent therein, a plate removably mounted in said cowl vent and having an aperture with a tubular flange around said aperture, means for drawing fresh air thereinto, comprising a blower housing and a rotary blower in said housing, a conduit connecting said blower housing with said tubular flange, and a heating element mounted within said housing.

3. In a vehicle having a cowl vent, means for heating and ventilating the interior of said vehicle comprising a blower, a conduit communicating at one end with the blower and at the other end with said cowl vent, and a heat interchanger associated with said blower for heating the air which is drawn into the vehicle by said blower.

4. In a vehicle provided with an air inlet, means for drawing air through said inlet and discharging it into the interior of said vehicle comprising a blower and a housing therefor, a conduit connecting said blower housing with the air inlet of said vehicle, a downwardly extending spout on said housing and a heating element removably mounted in said spout and extending across the mouth thereof for heating the air passing through said spout.

Signed at Chicago this 10th day of June, 1929.

FRED M. YOUNG.